United States Patent
Brooks et al.

(10) Patent No.: US 9,097,179 B2
(45) Date of Patent: Aug. 4, 2015

(54) DAMPING ASSEMBLY

(75) Inventors: Richard V. Brooks, Derby (GB); John Coupland, Derby (GB)

(73) Assignee: ROLLS-ROYCE PLC, London (GB)

( * ) Notice: Subject to any disclaimer, the term of this patent is extended or adjusted under 35 U.S.C. 154(b) by 988 days.

(21) Appl. No.: 12/768,135

(22) Filed: Apr. 27, 2010

(65) Prior Publication Data
US 2010/0284789 A1 Nov. 11, 2010

(30) Foreign Application Priority Data
May 5, 2009 (GB) .................... 0907578.9

(51) Int. Cl.
F01D 25/04 (2006.01)
F02C 7/045 (2006.01)
F02C 7/24 (2006.01)
F01D 5/26 (2006.01)

(52) U.S. Cl.
CPC . *F02C 7/045* (2013.01); *F01D 5/26* (2013.01); *F01D 25/04* (2013.01); *F02C 7/24* (2013.01); *F05D 2260/96* (2013.01); *F05D 2260/963* (2013.01); *Y02T 50/671* (2013.01); *Y02T 50/673* (2013.01)

(58) Field of Classification Search
CPC ........... F01D 25/04; F01D 25/06; F01D 5/26; F02C 7/045; F02C 7/24; F05D 2260/96; F05D 2260/963; F02K 1/827; Y10T 428/24149; Y10T 428/24744
USPC ........... 415/9, 119, 173.4; 181/250, 214, 288, 181/292
See application file for complete search history.

(56) References Cited

U.S. PATENT DOCUMENTS

| 3,819,009 | A | * | 6/1974 | Motsinger | 181/292 |
| 4,298,090 | A | | 11/1981 | Chapman | |
| 4,421,201 | A | | 12/1983 | Nelsen et al. | |
| 4,452,335 | A | * | 6/1984 | Mathews et al. | 181/214 |
| 4,692,091 | A | * | 9/1987 | Ritenour | 415/119 |
| 7,870,929 | B2 | * | 1/2011 | Farstad | 181/214 |
| 2005/0109557 | A1 | * | 5/2005 | Dravet et al. | 181/292 |
| 2005/0284690 | A1 | * | 12/2005 | Proscia et al. | 181/214 |

(Continued)

FOREIGN PATENT DOCUMENTS

| EP | 1 482 478 A3 | 12/2004 |
| EP | 1 568 869 A1 | 8/2005 |

(Continued)

OTHER PUBLICATIONS

Sep. 2, 2009 Search Report issued in United Kingdom Patent Application No. GB0907578.9.

(Continued)

*Primary Examiner* — Christopher Verdier
(74) *Attorney, Agent, or Firm* — Oliff PLC (57) ABSTRACT

Fan flutter attenuators are optimized so that they occupy the minimum area of the intake duct, and so can be accommodated more easily, without significantly compromising the area available for liners targeting community noise. In such circumstances resonators for flutter frequencies are typically associated with existing acoustic liner and take the form of chambers incorporating labyrinthine cores for absorption of acoustic frequency waves or utilize Helmholtz chambers with appropriate volumes and inlet pipe aperture configurations for tuning to desired flutter frequencies to be attenuated.

8 Claims, 4 Drawing Sheets

(56) References Cited

U.S. PATENT DOCUMENTS

| | | | |
|---|---|---|---|
| 2006/0065479 A1* | 3/2006 | Okawa et al. | 181/250 |
| 2007/0034446 A1* | 2/2007 | Proscia et al. | 181/290 |
| 2009/0266642 A1* | 10/2009 | Farstad | 181/213 |
| 2009/0293481 A1* | 12/2009 | Bethke | 181/213 |

FOREIGN PATENT DOCUMENTS

| | | |
|---|---|---|
| EP | 1 612 769 A3 | 1/2006 |
| EP | 1 624 251 A1 | 2/2006 |
| EP | 1 762 786 A1 | 3/2007 |
| EP | 1 860 301 A2 | 11/2007 |
| EP | 2 017 826 A2 | 1/2009 |
| EP | 1 860 301 A3 | 11/2009 |
| GB | 2 090 334 A | 7/1982 |

OTHER PUBLICATIONS

Mar. 17, 2014 European Search Report issued in European Patent Application No. EP 10 16 1133.

* cited by examiner

DAMPING ASSEMBLY

The present invention relates to damping assemblies, and more particularly to damping assemblies utilised to attenuate and reduce flutter in a gas turbine engine.

A number of factors are relevant to acceptable operation of a gas turbine engine. In addition to provision of propulsion it will also be understood that acceptability with regard to environmental noise, as well as acceptable maintenance and overhaul time periods, are required. Environmental noise produced by gas turbine engines is a concern, particularly when used for aircraft propulsion, such that acoustic liners are presented at inlets and within other parts of a cowling for a gas turbine engine to produce a lower level of noise. In addition to general noise, gas turbine engines also produce flutter at certain rotational speeds. Flutter is a self-excited vibration. When the aerofoils in a blade row vibrate, they generate unsteady aerodynamic forces on the blade row itself. Under most conditions, these unsteady aerodynamic forces cause the blade row to do work on the surrounding air, and the vibrations decay in amplitude. However, at certain operational conditions, the surrounding air can do work on the fan itself. If the work done by the air exceeds the work dissipated by mechanical damping, then the vibrations will grow. This instability is known as flutter.

Flutter is undesirable because it can generate large stresses in an engine. In turn, this may necessitate operating restrictions in terms of rotational speeds for the engine. For example, fan rotor blades are typically susceptible to flutter in certain fairly narrow rotational speed bands. With regard to such engines, provision is made to avoid the fans operating in certain speed bands: by writing the restriction into a flight manual used by operators; by implementing the restriction in an engine control system; or by designing the optimum operating points to be away from these regions. Unfortunately, such restrictions generally prevent full performance of the fan and engine being realised. Furthermore, flutter may vary with engine life and between engines. For example, the leading edges of fan rotor blades erode in service and generally tend to develop a rough, flat profile on the leading edge. The fan becomes more susceptible to flutter as the erosion proceeds. The flutter behaviour can be improved by restoring the original leading edge profile. Thus, it may be possible to avoid fan flutter in service by the requirement to re-profile leading edges of the aerofoils after a certain number of flights, but this adds significantly to maintenance costs and to down time for the engine and also reduces the life of the aerofoils through the reworking of the material.

Another factor which can influence fan flutter is intake shape and configuration. Different designs of intake can have a significant influence on the conditions at which fan flutter occurs. These variations are due to a fluttering fan generating noise. At low fan speeds, this noise cannot propagate upstream into the intake. However, at high speeds, the noise can propagate and become problematic. Some of the noise may propagate out of the intake entirely, and some may be absorbed by acoustic damping material in the intake. Furthermore, some of it may also be reflected back towards the fan. This reflected flutter noise produces an unsteady force in the fan. The amplitude of the unsteady force is dependent on the amplitude of the reflected wave and this force itself can be stabilising or destabilising dependent on the phase of the unsteady force relative to the unsteady blade velocity.

The transmission of flutter noise in an intake can be modelled using computer modelled acoustics. In such simulations it has been found that at low speed the reflection is relatively strong, but the phase is stabilising. At higher speeds the reflection is weaker but the phase becomes destabilising and at even higher speeds the phase continues to vary so that reflection can become stabilising again.

Within many arrangements for gas turbine engines in aircraft, an acoustic lining is provided at the intake to reduce environmental noise levels in the aircraft or on the ground. These noise acoustic liners have been found to improve flutter behaviour as well, but mainly because they attenuate reflected flutter noise. As the frequencies associated with flutter are typically well below the range primarily targeted by available environmental noise acoustic liners reflected flutter tones are only partially attenuated. Altering the properties of the noise acoustic liner to improve absorption of flutter frequencies is possible, but usually only at the expense of reducing attenuation of the target environmental noise frequency range. It will be appreciated that within a gas turbine engine space and weight are at a premium and therefore achieving optimised performance is a requirement.

In accordance with the present invention there is provided a damping assembly for flutter in a duct of a gas turbine engine, and a gas turbine engine incorporating such a damping assembly, as set out in the claims. The damping assembly may comprise a flutter damper and an acoustic environmental noise damper, the flutter damper including at least one resistive element in conjunction with at least one resonant chamber.

Embodiments of the present invention will now be described by way of example and with reference to the accompanying drawings in which.

A fluttering fan blade generates an acoustic tone with a characteristic frequency. This flutter acoustic wave is partially reflected from the intake system. Depending on the phase of the reflected wave relative to the outgoing wave, the reflected wave may stabilise or destabilise the fan for flutter. A computational acoustics code (ACTRAN) has been used in conjunction with a computational fluid dynamics code (HYDRA), to calculate the amplitude and phase of the reflection coefficient from the intake system. This approach has been used to determine the optimum acoustic impedance of a short length of the casing wall upstream of the fan, to eliminate flutter at certain key operating points. The optimum impedance is resistance between 0.2 ρc and 1.0 ρc (where ρ is the local air density, and c is the speed of sound), and reactance between −2.1 ρc and −1.3 ρc. but impedances in the range, resistance from 0.02 ρc to 2.0 ρc and reactance from −3.0 ρc to −0.6 ρc can be moderately effective.

As indicated above, control of flutter would have significant benefits with respect to engine design. However, if flutter behaviour of an engine needs to be improved significantly, then attempting to address both flutter and noise with the same liner is not an attractive proposition. On modern civil aeronautical gas turbine engines the noise liner normally occupies almost all of the available area in the intake (see later with regard to FIG. 8). In such circumstances increasing the area of an existing noise liner is not usually possible or practicable.

In accordance with the present invention, an alternative approach is taken in which two sets of dampers are provided. One damper in the liner is targeted at environmental noise and another damper configured for flutter control. By optimising the acoustic properties of the particular damper for flutter control, the area necessary to achieve the required flutter behaviour can be reduced minimising cost and weight. In such circumstances, the available area for an existing noise liner is only slightly reduced. The flutter damper does attenuate environmental noise to some extent. So replacing a small percentage of the noise liner with a flutter damper is not anticipated to significantly reduce attenuation of environmental noise.

Figure 10:
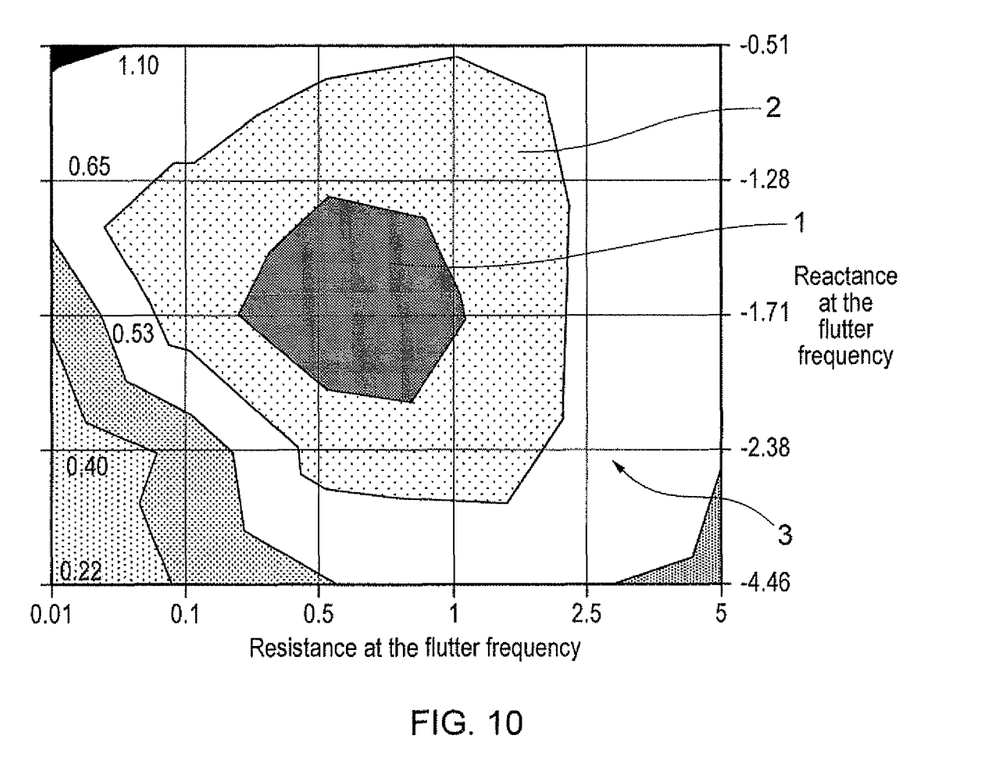
FIG. 10 shows the results for a very narrow flutter damper with non-dimensional length $L/R=0.052$ where R is the radius of fan tip leading edge.

The present invention relates to providing acoustic dampers which are optimised for flutter behaviour control. In order not to unduly disturb or reduce normal noise attenuation, damping assemblies utilised for flutter control in accordance with the present invention will be arranged to be both optimised and minimised in terms of duct surface area they occupy. It will be appreciated that the particular damper assembly will depend upon the flutter frequency it is desired to attenuate or reduce. FIG. 10 as described later illustrates the relative reactance at a flutter frequency against resistance at that flutter frequency where the non-dimensional length L/R=0.052 where R is the radius of a fan tip leading edge in a gas turbine engine. In order to produce the graphic representation depicted in FIG. 10, a model is provided in which consideration of a fan duct and intake in front of a fan is made. The model utilises a large volume around the nacelle so that transmission of noise out of the intake was accurately determined. A fluttering fan was represented by a tone with the correct frequency and radial/circumferential pressure distribution. The amplitude and phase at the fan plane was monitored. The acoustic properties of a short length of casing wall were modified to represent a flutter damper assembly in accordance with the present invention. The acoustic properties of the damper, that is to say reactance and resistance at the desired flutter frequency were varied systematically. For each damper assembly configuration, calculations were carried out over a wide range of fan speeds to ensure that the optimised flutter damper assembly is effective at all such speeds. In FIG. 10 the results show that a very narrow flutter damper assembly with the non-dimensional length L/R=0.052 can be highly effective if it has acoustic properties in region 1 and partially effective if it has acoustic properties in region 2. Region 1 provides in the range 75% to 100% improvement in the flutter margin due to the flutter damper assembly relative to the improvement in the margin which would occur if the amplitude of reflected flutter noise was reduced to zero. Flutter liners have previously been used on a military aircraft. The flutter liner was designed to have acoustic properties substantially at the point marked 3. The flutter liner had large axial extent, to achieve acceptable flutter attenuation. This was acceptable for a military aircraft, for which community noise was not a consideration. But community noise is a major consideration for civil aircraft. Given the constraints on total liner area, it would probably not be possible for a civil aircraft to meet its community noise targets with a flutter liner of this extent.

It is known that to be effective, flutter attenuating assemblies must have a resistance and reactance at the flutter frequency which is well outside the range of existing typical intake noise acoustic liners at the flutter frequency. Whilst flutter attenuating assemblies with acoustic properties at the desired flutter frequency in the range greater than 0.02 and less than 2.0 resistance and in the range −3.0 to −0.6 in terms of reactance can be effective, it is more desirable to provide flutter attenuating assemblies which have acoustic properties at the desired flutter frequency in the range 0.2 to 1.0 resistance and −2.1 to −1.3 in terms of reactance. Traditionally these values are not available as acoustic liners are designed to attenuate engine noise of a higher frequency than flutter. The values of resistance and reactance quoted above have been non-dimensionalised by ρc, (where ρ is the local air density, and c is the speed of sound).

In view of the above, what is required is a damper assembly which has acoustic properties which are optimised at the particular flutter frequency. Examples of such resonators are described below with regard to FIGS. 1 to 7.

As the resonators used in accordance with the present invention are optimised at their particular desired flutter frequency, it will be appreciated that the damper assemblies can be very narrow and are, therefore, more acceptable and effective. Furthermore, it is preferable that the flutter damping assembly is near to the source of flutter. If the flutter damper is close to the fan in a gas turbine engine and therefore the source of flutter then the phase of the wave reflected back from the flutter damper assembly is stabilising over a wide range of fan speeds. If the flutter damper assembly is a significant distance upstream of the fan, that is to say the source of flutter, the phase of this component and the reflected wave is no longer necessarily stabilising and the effectiveness of the flutter damper assembly drops significantly.

Flutter can occur in a number of patterns. Different circumferential patterns are possible. Similarly all fan blades may vibrate in a different mode. Each of these patterns is associated with a characteristic flutter frequency. For most fan and inlet systems, a few flutter patterns are of practical interest and these patterns will have similar characteristic flutter frequencies. Thus a single optimised narrow flutter damper assembly, in accordance with the present invention, will generally be adequate to improve overall flutter behaviour in most gas turbine engines. Occasionally, a fan may suffer from inadequate operating ranges in flutter mode with a wider range of frequencies. In this case, it may be necessary to increase the length of a flutter damper. In this specialist case, it may be best to have two or more adjacent narrow flutter damper assemblies to act on two or more desired flutter frequency bands. Clearly, this would double or triple the total length of the overall flutter damper assembly in the liner. Alternatively, a lesser increase in flutter damper length will be achieved by using a single form of flutter damper assembly in terms of the resonator used and using a slightly higher resistance in terms of damper characteristics for the acoustic waves of the flutter disturbance. Increasing damper assembly resistance will reduce peak attenuation but increase the range of frequencies for which the damper assembly is effective.

As illustrated with regard to FIG. 10, the best use of very short width flutter damper assemblies can have an effect on flutter almost comparable with eliminating reflected flutter noise entirely. This improvement in flutter behaviour is likely to be sufficient in most cases. However, where greater improvement is required, it may be possible to provide such improvement by considerably increasing the non-dimensional length of the flutter assembly in terms of width to radius. The optimum acoustic properties for a wide flutter damper assembly are not generally the same as those for a narrow substantially single desired flutter frequency damper assembly. Altering damper properties may generally not be an appealing prospect as the volume of the flutter damper assembly will tend to increase even further. For example, if a flutter damper assembly were to take a conventional acoustic liner form, then a large increase in liner depth in addition to a large increase in flutter liner length would be required for only a slight improvement in flutter behaviour over flutter response levels achieved through specific design of narrow but tuned flutter damping assemblies in accordance with the present invention.

Figure 1:
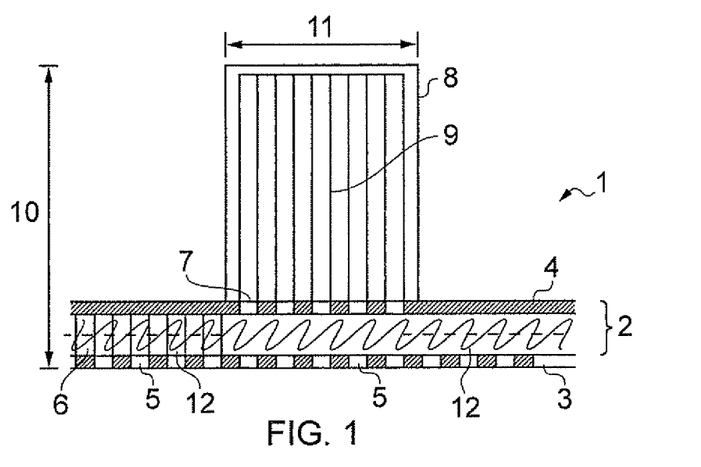
FIG. 1 is a schematic side cross section of a first embodiment of a damping assembly in accordance with the present invention.

A conventional acoustic liner used for relatively high frequency noise sound attenuation, comprises a first layer and a second layer of material sandwiching a core, typically formed from a honeycomb or other labyrinthine structure to provide attenuation for absorption as well as resonance effects. Damping assemblies in accordance with the present invention are generally combined with such existing liners to meet accumulated constraints. Thus, as depicted in FIG. 1 a damper assembly 1 is provided in which an acoustic liner 2 comprises a first layer 3 and a second layer 4. The first layer 3 incorporates perforations 5 in accordance with conventional configurations to provide for relatively high frequency noise attenuation in conjunction with a labyrinthine core 6. Generally, the second surface 4, where used as a normal acoustic liner, has no holes, and particularly attenuates relatively high frequency environmental noise. In accordance with the present invention, the second layer 4 also incorporates perforations 7. These second perforations 7 are required to allow the desired lower frequency flutter acoustic noise to enter a resonator 8. The resonator 78 comprises at least one chamber within which further honeycomb or other labyrinthine attenuating structures 9 are provided to attenuate the flutter acoustic noise. The chamber 8 has to be a relatively large size to dampen and attenuate the flutter acoustic noise. At least part of the chamber 8 is flexible to absorb acoustic energy.

Generally, the perforations 7 are substantially aligned with the opposed perforations 5 in the first layer 3, to allow transfer of the flutter wave for attenuation within the resonator 8. Alternatively, the perforations 7 may not be aligned with the perforations 5 in order to alter the resistance and reactance to flutter wave flow and therefore alter and tune the attenuation response. It will also be appreciated that the distribution in size of the apertures 7, as well as the apertures 5, in the overlapping portion of the liner 1, in accordance with the present invention, may have similar sizes or different sizes and distributions again to alter resistance and reactance as well as tune attenuation at the flutter frequency. The apertures 5, 7 will generally be round or slotted or oval. However, different shapes and configurations such as rows of slots staggered or aligned or arranged to have perpendicular relationships to each other, may be provided again to alter resistance and reactance for damping and attenuation tuning.

As will be appreciated, the size of the resonator 8 will depend upon the flutter frequency to be attenuated. Typically, to attenuate a flutter frequency in the order of 120 Hertz, the resonator 8 will have a height 10 in the order of 20 to 25 cm but this will depend upon the porosity of the perforations 5, 7, their distribution and the nature of the attenuating structure 9. As indicated above, a combination of a damper assembly 1 in accordance with the present invention within a gas turbine engine will typically be in addition to existing acoustic linings. In such circumstances the resonator 8 will generally have a width 11 in the order of 5 to 10 cm.

As indicated above, resistance and reactance to flutter wave flow is a significant factor with respect of attenuation. In such circumstances the porosity, that is to say the open space in the surfaces 3, 4 of the acoustic liner wall 2, will be altered and adjusted for particular performance. Typically, the porosity will be in the range 8% to 20% of the available area in the respective surface 3, 4. The porosity may be different in each layer 3, 4. It will be understood the higher the porosity, the lower the resistance to acoustic wave flow.

It will be noted that it is possible to provide a so called septum layer 12 in the normal acoustic liner wall 2. In accordance with the present invention, this septum layer 12 is removed in the region of the damper assembly opposite the resonator 8 and perforations 7 in most instances, to achieve the required resistance and reactance for the flutter liner.

Figure 2:
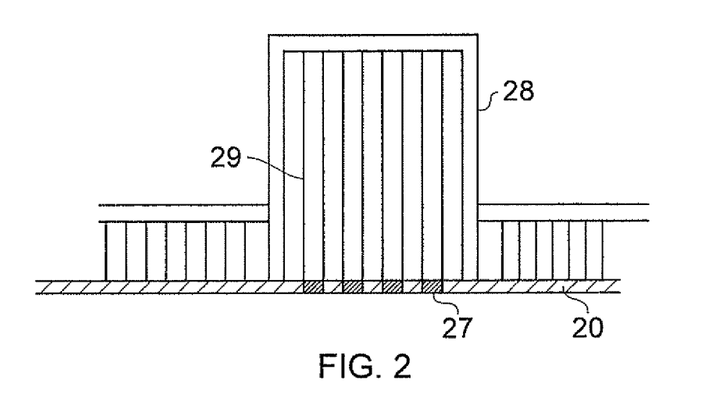
FIG. 2 is a schematic side cross section of a second embodiment of a damping assembly in accordance with the present invention.

In some circumstances, a simpler liner as depicted in FIG. 2 may be provided.

A liner 20 depicted in FIG. 2 in accordance with the present invention, is a substantially solid sheet of material with perforations 27 provided in the damper assembly area with a resonator 28 and attenuating structure provided. A damper assembly comprises a resonator 28 which will be tuned to the particular flutter frequency to provide damping.

Figure 3:
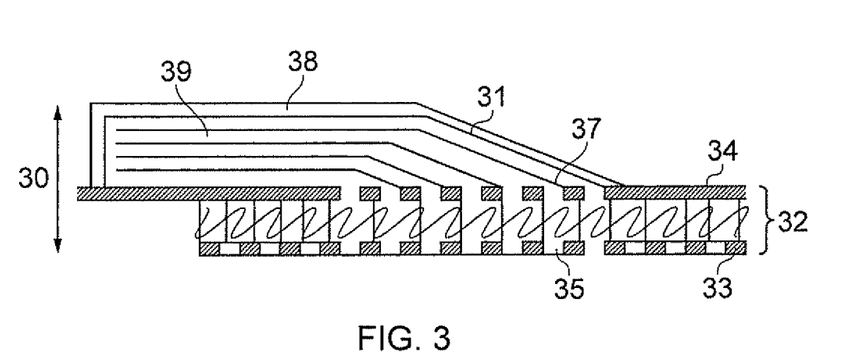
FIG. 3 is a schematic illustration of a third embodiment of a damping assembly in accordance with the present invention.

Accommodation within the casing for an engine may be difficult with a perpendicularly directed resonator as depicted in FIG. 1 or FIG. 2. It will be understood that space and weight are typically at a premium within a gas turbine engine when utilised within an aircraft. In such circumstances as depicted in FIG. 3 a resonator 38 can be turned to align laterally along the liner wall 32 to reduce the height 30 of the arrangement whilst maintaining length for attenuation. As indicated previously respective apertures 35, 37 are provided in a first surface 33 and a second surface 34 in order to receive acoustic flutter waves. The positioning, shaping and otherwise distribution of the perforations and apertures 35, 37 will depend upon the required reactance and resistance for acoustic attenuation in use. It will be noted that a turning surface 31 may be flat or curved dependent on requirements with respect to attenuation within the labyrinthine attenuating structure 39, which as indicated is typically in the form of a honeycomb.

Figure 4:
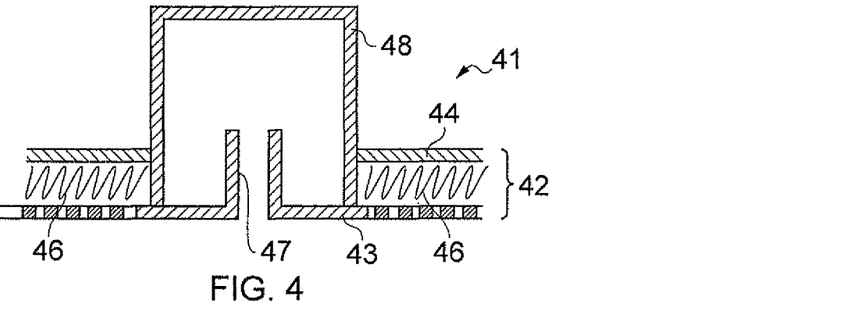
FIG. 4 is a schematic side cross section of a fourth embodiment of a damping assembly in accordance with the present invention.

An alternative fourth embodiment of an assembly 41 in accordance with the present invention is depicted in FIG. 4. Again, an acoustic liner 42 is provided comprising a first layer 43 and a second layer 44 with a core 46 between them. The acoustic liner 42, as indicated before, will provide attenuation of community noise. In this embodiment, a resonator 48 is provided of a Helmholtz type. Thus, the volume of the resonator 48 as well as the inlet aperture 47 in a perforation to define a pipe will determine the desired flutter frequency attenuated by the resonator 48. A Helmholtz resonator has no attenuating structure within it. The damping characteristics as indicated depend upon the volume of the resonator 48 as well as the neck configuration particularly of the pipe forming the inlet perforation or aperture 47. In such circumstances, again, the desired flutter frequency will be significantly attenuated by the resonator 48.

Figure 5:
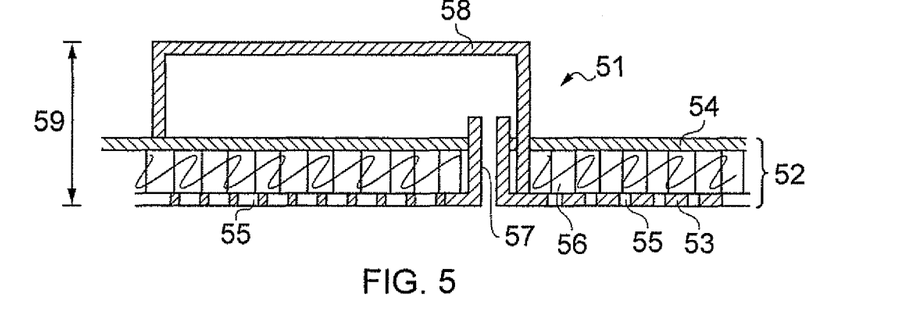
FIG. 5 is a schematic side cross section of a fifth embodiment of a damping arrangement in accordance with the present invention.

A further fifth alternative embodiment provides a further refinement as depicted in FIG. 5 of a resonator 58 located in an acoustic liner 52. Similar reference nomenclature has been utilised to that with regard to figures described previously but incremented by 10 to show equivalent elements. As previously, the resonator 58 is a Helmholtz resonator and it is the volume of the resonator as well as the shape and configuration of the inlet perforation pipe aperture 57 which will determine the desired flutter frequency attenuated by a damper assembly 51. As can be seen, the resonator 58 extends laterally along the rear of the liner wall 52 to reduce depth 59 and therefore improve acceptability for accommodation within a gas turbine engine.

Figure 6:
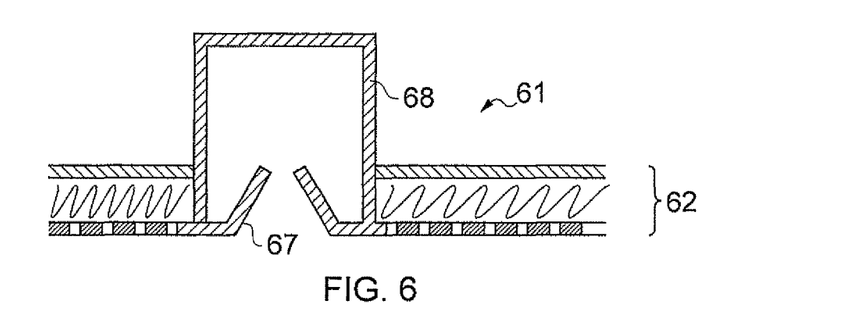
FIG. 6 is a schematic side cross section of a sixth embodiment of a damping assembly in accordance with the present invention.
Figure 7:
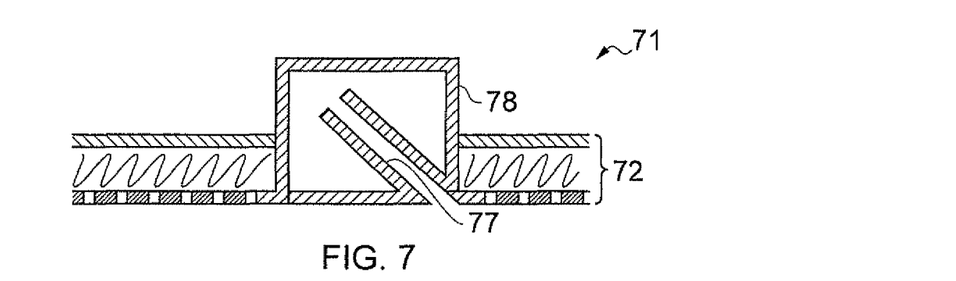
FIG. 7 is a part front cross section of a seventh embodiment of a damping assembly in accordance with the present invention.

It will be appreciated, as indicated, with regard to particularly Helmholtz resonators, the shape of the inlet perforation or aperture significantly effects and tunes the flutter frequency. In such circumstances, as depicted in FIG. 6 and FIG. 7, respective Helmholtz resonators 68, 78 are provided of a size to provide a characteristic flutter frequency attenuation in accordance with the present invention. In particular with regard to FIG. 6 and FIG. 7 it will be noted that the inlet perforation or aperture 67, 77 is angled or provided particular at a neck portion to provide or achieve tuning with respect to the flutter frequency attenuated. It will be noted that the resonators 67, 68 are located respectively in typical acoustic liner walls 62, 72. In such circumstances the resonator 68, 78 will act upon the flutter frequency to provide attenuation over a short width of the overall damper assemblies 61, 71 and so improve performance.

Figure 8:
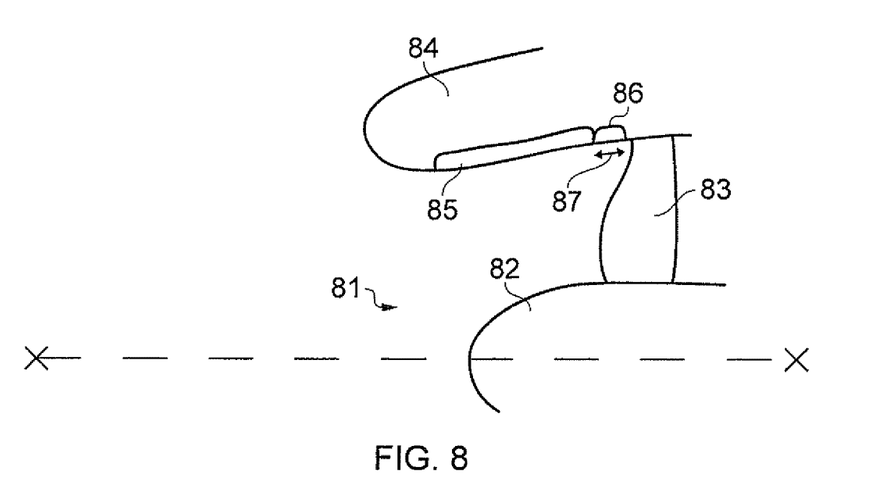
FIG. 8 is a schematic axial half side cross section of a gas turbine engine inlet.

As indicated above, space within an engine cowling of a gas turbine engine will typically be restricted and be at a premium. FIG. 8 provides a schematic illustration showing an engine 81 having a core engine 82 and blades 83 rotating about an axis X-X. The blades 83 rotate within a casing 84 which, as described previously, incorporates an acoustic lining 85 to reduce noise emissions from the engine 81. The normal acoustic noise lining wall 85 will typically extend for a considerable distance within the casing 84 but it is advantageous to position a damper assembly in terms of a resonator for the desired attenuation of the flutter frequency at a position near to the source, that is to say the blades 83. Thus, as indicated, an assembly, in accordance with the present invention, at least preferably positions the resonator 86 near to the blades 83. Such positioning limits the available space and width 87. In accordance with the present invention space and other requirements may necessitate consideration of the means for provision of the resonators.

Figure 9:
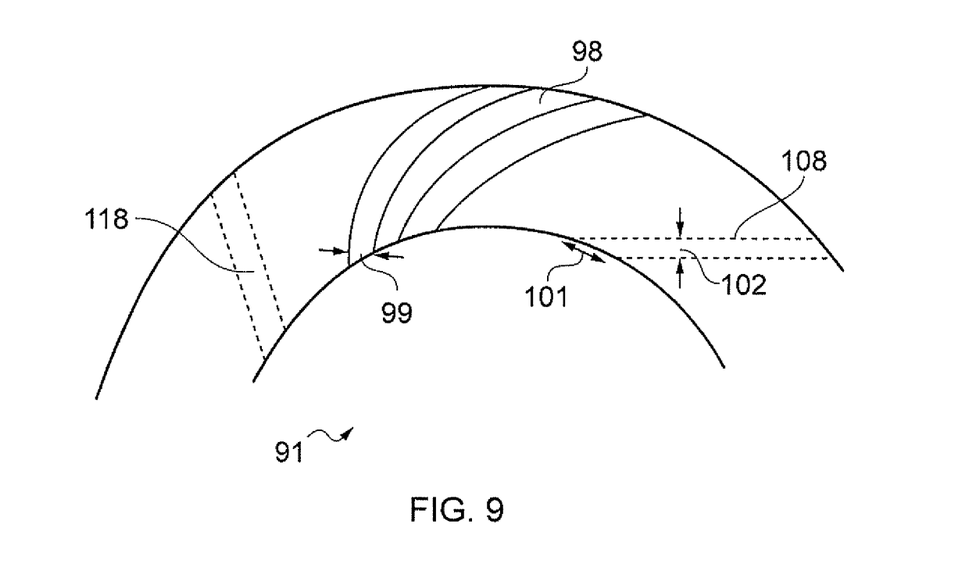
FIG. 9 is a schematic radial cross-section of a gas turbine intake showing an embodiment of a damping assembly in accordance with the present invention.

FIG. 9 illustrates one approach to accommodating a resonator within a small area. In such circumstances in a front part cross section, as can be seen, resonators 98 extend radially in a curved fan in order to achieve the desired length for attenuation at the flutter frequency. Thus, within the small space and width 87 as depicted in FIG. 8, resonators of appropriate length can be achieved. However, care must be taken as illustrated, that the angular presentation of the resonators does not choke the resonator. As can be seen with the broken line resonator 108, if the entrance width 101 is significantly greater than the width of the resonator 108, then there will be constriction of acoustic wave flow which will basically significantly alter the attenuation characteristics. In such circumstances, although curved or fluted configurations as depicted with regard to resonator 98 and angular presentation can be achieved, as depicted with resonator 108 control of the entrance width to resonator width must be maintained. In such circumstances the angle 99 of the association with a core engine 91 need not be 90 degrees but must be such that any constriction is limited.

With the above approaches attenuation of a flutter frequency can be achieved in combination with an existing liner wall utilised in a gas turbine engine. As depicted in FIG. 10, levels of attenuation can be varied and on occasion compromises made between achieving absolute attenuation and proportional attenuation due to the limited space to accommodate the resonator and other elements of damper assembly in accordance with the present invention. Nevertheless, as graphically depicted in FIG. 10 achievement of some desirable attenuation is possible.

Alterations and modifications to aspects of the present invention will be appreciated by those skilled in the technology. Thus, for example where space is available more than one resonator may be provided within a damper assembly in accordance with the present invention. Furthermore, these resonators may be tuned for different respective flutter frequencies where, under certain circumstances, second flutter frequencies may occur at certain rotation speeds or operational conditions.

The invention claimed is:

1. A damping assembly in a duct of a gas turbine engine having a rotational axis, the damping assembly comprising:
    a flutter damper and an acoustic environmental noise damper each having an inlet extending over a respective axial extent of the gas turbine engine, wherein:
        the acoustic environmental noise damper comprises a resistive element formed by a liner wall provided in the duct, the liner wall comprising a noise attenuation core, a first layer and a second layer, and the core extending from the first layer to the second layer so as to fill the space between the first layer and the second layer;
        the flutter damper includes the resistive element in conjunction with at least one resonant chamber, the combination of the resistive element and the resonant chamber configured to attenuate a desired flutter acoustic frequency by matching outward waves and reflected waves, and the attenuation of flutter being achieved by providing the resistance of the combination between 0.02 ρc and 2.0 ρc and the reactance between −3.0 ρc and −0.6 ρc, where ρ is the local air density, and c is the speed of sound;
        the resistive element includes perforation arrangements in the first layer and the second layer, the perforation arrangement in the second layer allowing the flutter acoustic noise to pass into the resonant chamber from the resistive element via the noise attenuation core;
        the axial extent of the inlet of the flutter damper is less than the axial extent of the inlet of the acoustic environmental noise damper; and
        the resonant chamber is turned so as to have a length that is aligned with the axial direction of the gas turbine engine, with the length of the resonant chamber extending over a greater axial extent than the perforation arrangement in the second layer.

2. The damping assembly as claimed in claim 1, the resistance of the combination being between 0.2 ρc and 1.0 ρc and the reactance being between −2.1 ρc and −1.3 ρc.

3. The damping assembly as claimed in claim 1 wherein the perforation arrangement in the first layer is not the same as the perforation arrangement in the second layer.

4. The damping assembly as claimed in claim 1 wherein the perforation arrangements in the first layer and in the second layer are not aligned with each other.

5. The damping assembly as claimed in claim 1 wherein each perforation arrangement has a porosity, in the order of 8% to 20% of the surface area in the perforation arrangement.

6. The damping assembly as claimed in claim 1 wherein at least part of the resonant chamber is flexible to absorb acoustic energy.

7. The damping assembly as claimed in claim 1 wherein the resonant chamber comprises an attenuating structure to alter attenuation of the desired flutter acoustic frequency.

8. A gas turbine engine incorporating a damping assembly as claimed in claim 1.

* * * * *